United States Patent
Armbruster et al.

[15] 3,652,398
[45] Mar. 28, 1972

[54] PRODUCTION OF CYCLODEXTRIN FROM GRANULAR MODIFIED STARCHES

[72] Inventors: Frederick C. Armbruster, La Grange; Mukhtar Abdullah, Westmon, both of Ill.

[73] Assignee: CPC International Inc.

[22] Filed: Dec. 20, 1968

[21] Appl. No.: 785,776

[52] U.S. Cl. .........................................................195/31 R
[51] Int. Cl. .....................................................C12b 1/00
[58] Field of Search.......................195/7, 31, 32, 42, 65, 66, 195/103.5

[56] References Cited

UNITED STATES PATENTS 3,425,910  2/1969  Armbruster et al......................195/31

OTHER PUBLICATIONS

French et al. I J. Am. Chem. Soc. Vol. LXXI (71) p. 353–356; 1949.

French et al. II Die Starke Vol. 15 p. 280–284; 1963.

*Primary Examiner*—A. Louis Monacell
*Assistant Examiner*—Gary M. Nath
*Attorney*—Frank E. Robbins, James L. Bailey, Janet E. Price, Robert D. Weist, Martha A. Michaels and Dorothy R. Thumler

[57] ABSTRACT

A process is described for the production of cyclodextrin which comprises: providing a water solution of a gelatinized granular modified starch; subjecting said solution to the action of cyclodextrin transglycosylase enzyme in the presence of a chemical selected from the group consisting of chemicals which will form a complex with cyclodextrin and mixtures thereof; and recovering a product containing cyclodextrin.

14 Claims, No Drawings

PRODUCTION OF CYCLODEXTRIN FROM GRANULAR MODIFIED STARCHES

This invention relates to the production of high yields of cyclodextrins from granular modified starches by the action of a cyclodextrin transglycosylase such as *Bacillus macerans* amylase in the presence of a complexing agent for the cyclodextrins.

The cyclodextrins are a group of homologous oligosaccharides that are obtained from starch by the action of cyclodextrin transglycosylase. The cyclodextrins are known as Schardinger dextrins from an early investigator who studied these materials. They are homologous cyclic molecules containing 6 or more $\alpha$-D-glucopyranose units linked together at the 1,4 position as in amylose. The cyclic molecule may also be referred to as a torus. As a consequence of the cyclic arrangement, this torus is characterized by having neither a reducing end group nor a non-reducing end group. The torus molecule is depicted in the following schematic formula where the hydroxyl groups are shown in the 2,3 and 6 positions in the illustrated anhydroglucose units. The letter $n$ may be a number from 4 to 6 or higher.

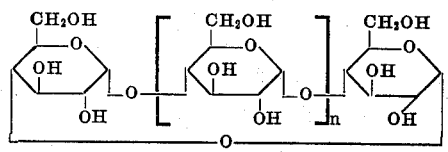

When $n$ is 4, the torus molecule is known as $\alpha$-cyclodextrin or cyclohexaamylose because the torus contains 6 anhydroglucose units. When $n$ is 5, the seven unit member is known as $\beta$-cyclodextrin or cycloheptaamylose and when $n$ is 6 the eight unit member is known as $\gamma$-cyclodextrin or cyclooctaamylose. When reference is made herein to "-cyclodextrin" it is intended to include the foregoing forms as well as other tori that have a still larger number of units in the molecule as well as mixtures of these.

Cyclodextrin is produced from starch by the action of a cyclodextrin transglycosylase enzyme. The source of the enzyme is presently a culture of *Bacillus macerans* which is grown under conventional conditions on conventional media containing sources of nitrogen, carbon, growth factors and minerals. The cyclodextrin transglycosylase may be produced by following published teachings such as, for example, those described by D. French in *Methods in Enzymology*, S.P. Colowick and N.O. Kaplan, editors, Academic Press, New York, New York, Volume V, pp. 148–155 (1962).

The cyclodextrin transglycosylase activity in cultures of Bacillus macerans can be measured by the Tilden-Hudson procedure as described by these two workers in *J. Bacteriol*, 43, 527-544, (1942). In general, the cyclodextrin transglycosylase is added to a dilute solution of a gelatinized starch whereupon a conversion to cyclodextrin occurs by enzymolysis.

Previous attempts to enzymatically synthesize cyclodextrin from granular modified starches were performed at temperatures of from about 40° C. to about 45° C. and without the presence of the complexing agent for cyclodextrin during incubation. These attempts have resulted in very poor yields of product, as reference the work of D. French et al, Die Starke 15, 280–284 (1963) and R.W. Kerr, J. Am. Chem. Soc. 65, 188–193 (1943). As a result of this published work, granular modified starches have been dismissed as being impractical for use as substrates for cyclodextrin production.

If however, granular modified starches could be employed to produce cyclodextrin, their use would offer substantial advantages over the use of unmodified starches, in that, upon gelatinization the modified starches remain fluid at much higher solids concentrations than do unmodified starches. As is suprisingly shown in this invention, certain of the modified starches can be handled and efficiently converted to cyclodextrin at high solids concentrations. Unmodified starch, on the other hand, cannot be used above about 5 percent solids, as reference the previously cited work of D. French et al. The advantage to this is that per quantity of cyclodextrin produced, a much lesser volume of liquid must be handled, heated, and processed when granular modified starches, instead of unmodified starches, are used for cyclodextrin production.

An advantage to the use of granular modified starches over enzyme-or acid-thinned starches is that granular modified starches are commercially available and can be converted directly to cyclodextrin without a separate enzyme- or acid-thinning step. This could be an important commercial consideration for a facility that lacks and does not wish to invest in starch-thinning equipment.

The cyclodextrin produced in accordance with this invention is useful for the same purposes as cyclodextrin produced by prior art processes. For example, the product produced in accordance with this invention is useful as a flavor retaining agent to reduce staling of tobacco and may be disposed on a supporting base to retain flavors upon tobacco filters which flavors are released when the tobacco is burned and the temperature of the filter rises. Cyclodextrin is also useful, as is well known, as an inclusion agent and for this reason finds application in chromatography. Cyclodextrin has established utility and in addition is a subject of study for further applications. A method of producing relatively high yields of cyclodextrin from concentrated solutions of granular modified starches is thus understandably desirable.

Accordingly, the primary object of this invention is to provide a process for the production of cyclodextrin in high yield from granular modified starch.

Another object of the invention is to provide a method for producing cyclodextrin which may be used to form a variety of inclusion compounds generally of the type recognized in the art.

It is still another object of the invention to provide a method for obtaining cyclodextrin which may be employed as an intermediate in various chemical reactions.

A further object is to provide a process for converting granular modified starch to cyclodextrin utilizing solutions of granular modified starch containing more than 5 percent by weight of such starch.

Other objects will be self-evident or will appear hereinafter.

In general, the process discovered for the production of cyclodextrin comprises: providing a water solution of a gelatinized granular modified starch; subjecting said solution to the action of a cyclodextrin transglycosylase enzyme in the presence of a chemical selected from the group consisting of chemicals which will form a complex with cyclodextrin and mixtures thereof; and recovering a product containing cyclodextrin.

The term "granular modified starch" refers to a starch material modified by chemical and/or physical treatment in the granular state. Such materials may be produced by chemical treatment (e.g., by acidic reagents, oxidizing reagents, or derivatizing reagents) in water suspensions at subgelatinization temperatures, or by heat or by a combination of heat and chemical treatment in the dry state. Examples of granular modified starch are acid-modified starch, oxidized starch, thin boiling starch, and dextrin.

To obtain maximum cyclodextrin yields, it is important that the intrinsic viscosity (as later defined) of the granular modified substrates does not exceed about 1, otherwise the substrates become unmanageable and retrograde during the conversion.

It is essential that the conversions be conducted in the presence of a suitable complexant.

Some dextrins, for example, canary dextrins, can be handled at high solids levels, but are too degraded and modified to give appreciable yields of cyclodextrin. Consequently, it is granular modified starch, for example, slurry process acid-modified starch, dry roasted acid-modified starch such as white dextrin, dry roasted base modified starch, granular oxidized starch, gum dextrin, and starch which has been both acid-modified and oxidized and which represents a degree of modification between unmodified starch and canary dextrin, that possesses the most desirable properties for the practice of this invention. Mixtures of granular modified starches may also be employed in the practice of this invention.

Slurry process acid-modified starch is produced by treating unmodified starch with dilute acid at temperatures below the gelatinization point of the starch. Typically, starch is suspended in dilute sulfuric acid solutions at temperatures of between 50° C. and 55° C. and stirred at this temperature until the potential paste viscosity of the suspended starch is reduced to the desired level. The suspension is then neutralized with sodium carbonate, filtered, washed, and dried.

Dry roasted acid-modified starch such as white dextrin, is manufactured by spraying starch which contains from about 5 percent to about 7 percent moisture with a dilute mineral acid such as hydrochloric acid, and then heating to a temperature falling in the range of from about 79° C. to about 121° C. for a time in the range from about 3 hours to about 8 hours.

Granular oxidized starch is made by suspending the starch in water solution at a temperature below the gelatinization temperature of the starch and adding an oxidizing agent. Typically, the oxidation is carried out by making the solution basic with sodium hydroxide and bubbling in chlorine gas. The reaction probably takes place through the intermediate formation of a hypochlorite ion.

Dry roasted base modified starch may be produced by mixing a base such as sodium carbonate or urea with a starch prior to heating it in the dry state to a dextrinization temperature.

The modification of starch in the granular state involves conventional procedures such as are disclosed in far more detail, for example, in Starch: Chemistry and Technology, Vol. 1 and 2, R.L. Whistler and E.F. Paschall, editors, Academic Press Inc., New York and London, (1967), and in Chemistry and Industry of Starch, Second Edition, R.W. Kerr, editor, Academic Press Inc., New York (1950).

Solubilization is carried out by heating a modified starch slurry to above the gelatinization temperature of about 65° C. Incubation is performed at a temperature of at least 30° C. and very preferably at a temperature falling within the range from about 50° C. to about 55° C.

In a preferred embodiment of the invention, the pH of the solution is adjusted to fall in the range from about 5 to about 8 during the incubation with cyclodextrin transglycosylase. Most preferably, the pH is adjusted to fall in the range of from about 6.5 to about 7.5. Such pH adjustment may be brought about through the addition of any base or acid. Preferably, the pH adjustment is brought about through addition of sodium carbonate or hydrochloric acid.

It is preferred that the amount of cyclodextrin transglycosylase utilized be measured so that the reaction will be completed within about 1 to 7 days. Most preferably, the amount of cyclodextrin transglycosylase added will be measured so that the reaction will be completed within 4 to 7 days. Preferably, the amount of cyclodextrin transglycosylase added will fall in the range of from about 100 to about 1,000 Tilden-Hudson units per 100 grams of starch.

In order to obtain maximum yields of cyclodextrin it is essential that the conversion be conducted in the presence of a suitable complexant that complexes with the cyclodextrin as it is synthesized, and thereby induces the desired enzymatic reaction to proceed. Addition of the complexant after the incubation is completed will not lead to high yields of cyclodextrin. The amount of complexant required is that amount which will complex with substantially all of the cyclodextrin synthesized, although the complexant may be supplied in excess, of course. Reducing the complexant to a concentration significantly below the amount that will complex with substantially all of the cyclodextrin results in decreased yields of cyclodextrin. Suitable cyclodextrin complexants are well known to those skilled in the art and include cyclohexane, hexane, toluene, n-decane, methyl salicylate, chloroform, p-xylene, p-cymene, tetrachloroethylene, bromobenzene, carbon disulfide, trichloroethylene, benzene, tetrachloroethane, carbon tetrachloride, and mixtures thereof. Toluene is representative of a typical complexant useful in the practice of this invention.

The concentration of granular modified starch which is to be converted to cyclodextrin is preferably in the range of 10 to 40 weight per cent (grams per 100 milliliters of solution). Most preferably, the starch concentration is in the range of 20 to 30 weight per cent.

The cyclodextrin complex products of this reaction are generally insoluble and precipitate out of solution. They may be recovered by filtration, centrifugation and the like. The cyclodextrin complexes may be dissolved in boiling water and boiling may be continued until the chemical which is complexed with the cyclodextrin is expelled from the solution. Upon cooling, the purified cyclodextrin may then be crystallized and recovered by conventional methods.

When such conditions are employed it has been found, in surprising contrast with the prior art, that granular modified starch can be efficiently converted to cyclodextrin, and that the conversion can be carried out at solid levels of well above 5 weight per cent.

The following examples are presented to teach the various embodiments for practicing the invention. It should be understood that these examples are meant to be illustrative and the invention is not to be limited thereto. All parts and percentages are by weight unless expressly stated to be otherwise.

EXAMPLE I

Conversion of Acid-modified Potato Starch to Cyclodextrin

A 10 kilogram quantity of potato starch was suspended in 20 liters of distilled water at 51° C. while being stirred, 1,020 grams of concentrated sulfuric acid was added to the slurry after which time the acid concentration corresponded to 1.27 normal. 10 separate 2 liter quantities of the reaction mixture were withdrawn after modification in the acid slurry for 10 different time periods. Each 2 liter quantity was filtered. The filter cakes of acid-modified starch solids were each separately resuspended in water, neutralized with a sodium carbonate solution to pH 6, and filtered again. After the filter cakes thus obtained were washed to remove residual sodium carbonate, they were dried at 50° C. to 60° C.

In the conversion to cyclodextrin, 1 portion each was taken from 7 of the 10 filter cakes and 2 portions each from the remaining 3 filter cakes for a total of 13 partial portions. These 13 partial portions were suspended in 13 individual quantities of distilled water at 10 percent, 20 percent and 30 percent solids content and heated to boiling to achieve gelatinization and solubilization. Each starch solution was then cooled to 50° C. The pH was adjusted to fall in the range from 6.5 to 7.5 and cyclodextrin transglycosylase was added at a concentration of 650 units per 100 grams of starch (dry basis). The cyclodextrin conversions were continued for 6 days at 50° C. during which time the solutions were constantly shaken.

The conversions were conducted in the presence of toluene which was added to each conversion mixture at a concentration of 10 milliliters per 100 milliliters of starch solution.

The cyclodextrin produced, which was in the form of insoluble toluene complexes, was recovered by vacuum filtration. The filter cakes were separately washed with cold water which had been saturated with toluene, recovered and dried under vacuum at 75° C. for 36 hours. Crude cyclodextrin yields for each of the 13 individual quantities converted in this manner were calculated based on the weight of the dried complex. Gas chromatographic analysis of the crude products showed that they contained about 80 percent cyclodextrin, the balance being comprised of moisture, toluene complexant, and some linear starch fragments. The following table shows the conversion results obtained using portions of potato starch that have been acid-modified as described above for the time specified as compared to results obtained using an unmodified control.

The intrinsic viscosities of the modified starches were determined by the procedure of T.J. Schoch (Methods in Enzymology, Vol. 3, S.P. Colowick and N.O. Kaplan, editors, Academic Press Inc., New York pp. 15–17 (1957)).

TABLE I

[Conversion of acid-modified potato starch to cyclodextrin]

| Time of acid modification (hours) | Intrinsic viscosity | Substrate concentration (gram 100 ml.) | Cyclodextrin yield | | | |
|---|---|---|---|---|---|---|
| | | | Crude | | By gas chromatography | |
| | | | Percent of starch converted | Gram per 100 ml.) | Percent of starch converted | Gram per 100 ml. |
| 54 | 0.09 | 30 | 47 | 14.0 | 39 | 11.8 |
|  |  | 20 | 47 | 9.4 | 38 | 7.6 |
| 48 | 0.09 | 30 | 51 | 15.3 | 44 | 13.1 |
|  |  | 20 | 53 | 10.6 | 44 | 8.9 |
| 36 | 0.10 | 30 | 44 | 13.2 | 36 | 10.7 |
| 30 | 0.13 | 30 | 45 | 13.6 | 37 | 11.1 |
|  |  | 20 | 64 | 12.9 | 57 | 11.4 |
| 24 | 0.13 | 20 | 60 | 12.0 | 52 | 10.3 |
| 12 | 0.20 | 20 | 51 | 10.1 | 42 | 8.4 |
| 6 | 0.34 | 10 | 50 | 5.0 | 41 | 8.2 |
| 3 | 0.53 | 10 | 45 | 4.5 | 35 | 3.5 |
| 1 | 0.76 | 10 | 55 | 5.5 | 44 | 4.4 |
| 0.5 | 1.15 | 10 | ¹0 | | | |
| Unmodified control | 2.45 | 10 | ¹0 | | | |

¹ Retrograded.

The following analytical method was used to determine the cyclodextrin present in the crude product.

Essentially, the method involved conversion of the cyclodextrin to a cyclodextrin-dimethylsilyl ether complex in pyridine solution. The converted cyclodextrin was then separated from other components according to molecular size on a gas chromatographic column, and its concentration measured by a flame ionization detector upon elution from the column.

More specifically, an appropriate measured amount of a standard cyclodextrin, that is, one approximately similar to the one being determined, was weighed into a 25 ml. volumetric flask. 4.0 ml. of pyridine, 4.0 ml. of tetramethyldisilazane and 0.4 ml. of trifluoroacetic acid were then added to the flask. After the reaction had subsided, the contents of the flask were mixed and boiled for 15 minutes on a hot plate. The flask was then cooled and diluted to volume with pyridine. A microliter portion of the solution was removed and injected into the chromatograph whereby the various components were eluted. When the last component had been eluted the area under the cyclodextrin peak was determined using a suitable method of integration.

The sample to be analyzed was then weighed accurately in an amount of about 100–110 mg. of total cyclodextrin sample. This amount was placed into a 25-ml. volumetric flask, 5 ml. of distilled water was added, and the cyclodextrin and water were then mixed. The water was allowed to evaporate completely on a steam bath and the above described reagents were added. The just-described chromatograph procedure was then followed and the concentration of the cyclodextrin was obtained by comparing standard and sample areas for the cyclodextrin according to the following equation. Percent cyclodextrin was then calculated in the following manner:

$$\text{Percent cyclodextrin} = 100 \times \frac{(\text{Sample cyclodextrin area} \times \text{attentuation}) \times (\text{standard cyclodextrin weight})}{(\text{Standard cyclodextrin area} \times \text{attentuation}) \times (\text{sample weight})}$$

The data point out the importance of producing cyclodextrin from granular modified starch with an intrinsic viscosity of below about 1. The practicality of operating at high solids content is also demonstrated.

Cyclodextrin produced as in this example may be used as a flavor releasing agent in tobacco and on tobacco filters. It may also find application in chromatography.

EXAMPLE II

Production of Cyclodextrin From Acid Modified Corn and Waxy Milo Starch

Several commercially available granular acid-modified corn and waxy milo starches, of different fluidity numbers, were suspended in separate portions of distilled water at either 10 percent or 20 percent solids, and heated to boiling to gelatinize and solubilize them. The starch solutions were then cooled to 50° C., adjusted to a pH falling in the range from 6.5 to 7.5 and cyclodextrin transglycosylase was added at a concentration of 650 units per 100 grams of starch (dry basis). The cyclodextrin conversions were continued for 6 days at 50° C. with agitation. The conversions were conducted in the presence of toluene which was added to the conversion mixture at a concentration of 10 milliliters per 100 milliliters of starch solution.

The fluidity number of an acid-modified starch is defined as the number of milliliters of a standard alkaline starch paste delivered by a funnel with a special tip in the time required by the same funnel to deliver 100 milliliters of water. The standard procedure for determining fluidity is described in more detail by P. Shildneck and C.E. Smith in Starch: Chemistry and Technology, R.L. Whistler and E.F. Paschall, editors, Academic Press, New York and London, Vol. II, pg. 219, (1967).

The resulting cyclodextrin products were recovered and purified as in Example I. The following table shows the conversion results obtained using the commercially available acid-modified corn and waxy milo starches.

TABLE II

[Conversion of acid-modified corn and milo starch to cyclodextrin]

| Substrate | Intrinsic viscosity | Substrate concentration (gram per 100 ml.) | Cyclodextrin yield | | | |
|---|---|---|---|---|---|---|
| | | | Crude | | By gas chromatography | |
| | | | Percent of starch converted | gram per 100 ml. | Percent of starch converted | gram per 100 ml. |
| Corn starch: | | | | | | |
| 90 fluidity | 0.19 | 20 | 70 | 14.0 | 37 | 7.4 |
| 90 fluidity | 0.22 | 20 | 67 | 13.4 | 40 | 8.0 |
| 80 fluidity | 0.30 | 20 | 50 | 10.0 | 32 | 6.3 |
| 60 fluidity | 0.67 | 10 | 63 | 6.3 | 45 | 4.5 |
| 40 fluidity | 0.82 | 10 | 63 | 6.3 | 43 | 4.3 |
| Waxy Milo starch: | | | | | | |
| 80 fluidity | 0.43 | 20 | 65 | 13.0 | 56 | 11.2 |
| 40 fluidity | 1.03 | 10 | 50 | 5.0 | 43 | 4.3 |

The data demonstrate that cyclodextrin may be produced by the method of this invention from commercial granular acid-modified corn and waxy milo starches.

EXAMPLE III

Production of Cyclodextrin from White, Canary and Gum Dextrin

Several samples of commercially available white dextrins, canary dextrins and gum dextrins were suspended in separate quantities of distilled water at 20 percent solids, and heated to boiling to gelatinize and solubilize them. Each starch solution was then cooled to 50° C., adjusted to a pH falling in the range from 6.5 to 7.5, and cyclodextrin transglycosylase was added at a concentration of 650 units per 100 grams of starch. The cyclodextrin conversions were continued for 6 days at 50° C. with agitation. The conversions were conducted in the presence of toluene which was added to each conversion mixture at a concentration of 10 milliliters per 100 milliliters of starch solution. The cyclodextrin products were collected and purified as in Examples I and II. The following table shows the conversion results obtained using the commercially available white, canary and gum dextrins.

starch solution. The cyclodextrin produced from each sample was recovered separately as described in Example I. The following table shows the conversion results obtained using commercially available oxidized starches.

The amount of reaction of a particular starch is generally expressed as a degree of substitution (D.S.). As is known, the repeating anhydroglucose units in starch may have different degrees of substitution from one to three. In a given quantity of starch there will generally be some anhydroglucose units that are not substituted at all (D.S.,O), together with other anhydroglucose units that have different degrees of substitution, from 1 to 3.

A statistical average is employed to characterize the average D.S. of the entire quantity, although the figure is ordinarily stated as the D.S. rather than the average D.S. Thus, a D.S. of less than 1, as exhibited by the oxidized starches of this example, is possible.

This example illustrates the adaptability of this invention to a wide variety of oxidized starches of differing D.S. values. It also illustrates that starches which have been both acid-modified and oxidized may be utilized in practicing the invention.

TABLE III

| Substrate | Intrinsic viscosity | Substrate concentration (gram per 100 ml.) | Cyclodextrin yield | | | |
|---|---|---|---|---|---|---|
| | | | Crude | | By gas chromatography | |
| | | | Percent of starch converted | Gram per 100 ml. | Percent of starch converted | Gram per 100 ml. |
| White dextrin: | | | | | | |
| 4% soluble | 0.14 | 20 | 66 | 13.3 | 45 | 9.0 |
| 25% soluble | 0.09 | 20 | 53 | 10.5 | 43 | 8.5 |
| 45% soluble | 0.09 | 20 | 40 | 8.0 | 30 | 5.9 |
| 45% soluble | 0.09 | 20 | 45 | 9.0 | 37 | 7.3 |
| 78% soluble | 0.09 | 20 | 30 | 6.0 | 25 | 5.0 |
| 85% soluble | 0.08 | 20 | 39 | 7.9 | 33 | 6.5 |
| Canary dextrin: | | | | | | |
| 97% soluble | 0.10 | 20 | 14 | 2.8 | 11 | 2.1 |
| 99% soluble | 0.06 | 20 | 4 | 0.8 | | |
| Gum dextrin: | | | | | | |
| 13% soluble | 0.23 | 20 | 45 | 8.9 | 32 | 6.5 |
| 85% soluble | 0.10 | 20 | 23 | 4.5 | 17 | 3.3 |

TABLE IV

[Conversion of oxidized granular modified starch to cyclodextrin]

| Substrate (D.S. carboxyl) | Intrinsic viscosity | Substrate concentration (gram per 100 ml.) | Cyclodextrin Yield | | | |
|---|---|---|---|---|---|---|
| | | | Crude | | By gas chromatography | |
| | | | Percent of starch converted | Gram per 100 ml. | Percent of starch converted | Gram per 100 ml. |
| Oxidized corn starch: | | | | | | |
| .48 | 0.36 | 20 | 53 | 10.6 | 44 | 8.8 |
| .77 | 0.24 | 20 | 56 | 11.0 | 48 | 9.6 |
| .41 | 0.36 | 20 | 50 | 10.0 | 42 | 8.3 |

The data indicates that white dextrin and gum dextrin may be appreciably converted to cyclodextrin by the method of this invention but that canary dextrin is too degraded to give practical cyclodextrin yields.

EXAMPLE IV

Production of Cyclodextrin From Oxidized Starch

Several samples of commercially available granular modified oxidized starches were suspended in separate quantities of distilled water at 20 percent solids content and heated to boiling to gelatinize and solubilize them. Each starch solution was then cooled to 50° C., adjusted to a pH falling in the range from 6.5 to 7.5, and cyclodextrin transglycosylase was added at a concentration of 650 units per 100 grams of starch. Cyclodextrin conversions were continued for 6 days at 50° C. with agitation. The conversions were conducted in the presence of toluene which was added to each conversion mixture at a concentration of 10 milliliters per 100 milliliters of

EXAMPLE V

Effect of Conversion Conditions On Cyclodextrin Yield

The effects of the presence or absence of a complexant, varying the incubation temperature from 40° C. to 50° C., and varying the enzyme dosage from 180 to 650 units per 100 grams of starch (dry basis) were determined in a series of experiments. All of the experiments were carried out basically in conformity with Example I. The starch used for the tests was waxy milo starch with a fluidity number of 80. It was used at a concentration of 20 grams solids per 100 milliliters of solution. The results of these studies are summarized in the following table.

The necessity for the presence of a complexant and the preferability of using an incubation temperature of at least 50° C. are amply demonstrated by the data. The enzyme dosage is shown to not be critical down to a level of 180 units per 100 grams of starch (dry basis).

TABLE V
[Effect of conversion conditions on cyclodextrin yield a]

| Complexant | Incubation temperature (° C.) | Enzyme dosage (units per 100 gram d.b.) | Cyclodextrin yield (gas chromatography) | |
|---|---|---|---|---|
| | | | Percent of starch converted | Gram per 100 ml. |
| Toluene | 40 | 180 | 17 | 3.4 |
| Do | 40 | 650 | 25 | 5.0 |
| Do | 50 | 180 | 52 | 10.4 |
| Do | 50 | 650 | 56 | 11.2 |
| None | 40 | 180 | 6 | 1.2 |
| Do | 40 | 650 | 4 | 0.8 |
| Do | 50 | 180 | 4 | 0.8 |
| Do | 50 | 650 | 14 | 2.8 | a Substrate=Waxy milo starch, 80 fluidity, at concentration of 20 grams solids per 100 ml.

As seen above, acid-modified starches, oxidized starches, and dextrins, possessing intrinsic viscosities less than about 1, when converted with cyclodextrin transglycosylase by the prescribed procedure, result in cyclodextrin yields substantially greater than 3 grams per 100 milliliters which is the maximum yield attainable from unmodified starch substrates.

The advantages of the present invention are many. One important advantage is that the process permits cyclodextrin conversion to be efficiently performed at high solids concentration. Another advantage is that cyclodextrin can be produced in high yields from commercially available granular modified starches. Another important feature of the invention is that it leads to improved process economics. Particularly, because lower capital expenditures are required since commercially available granular modified starches may be used and because such starches may be used at substrate levels of higher than 5% solids concentration. As a result of this invention, it is not only possible to conduct the conversions at high substrate levels, but it is also desirable to do so because the advantages listed above are realized with little or no decrease in conversion efficiency.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows.

What is claimed is:

1. A method for preparation of cyclodextrin from a granular modified starch which comprises:
   forming an aqueous slurry of granular modified starch having a starch solids content of at least 5 percent by weight;
   heating said slurry to gelatinize said granular modified starch;
   subjecting said slurry to the action of a cyclodextrin transglycosylase enzyme in the presence of a chemical which will complex cyclodextrin to obtain an insoluble complex product; and
   recovering said insoluble complex product.

2. The method according to claim 1 wherein the intrinsic viscosity of said granular modified starch is below about 1.

3. A method for preparation of cyclodextrin from a granular modified starch which comprises:
   forming an aqueous slurry of granular modified starch having a starch solids content of at least 5 percent by weight;
   heating said slurry to gelatinize said granular modified starch;
   subjecting said slurry to the action of a cyclodextrin transglycosylase enzyme at a temperature of from about 40° C. to about 65° C. and at a pH of from about 5 to about 8 in the presence of a chemical which will complex cyclodextrin to obtain an insoluble complex product;
   recovering said insoluble complex product.

4. The method according to claim 3 wherein the pH of the water solution of said gelatinized starch is adjusted to fall within the range from about 6.5 to about 7.5 during said incubation.

5. The method according to claim 3 wherein said cyclodextrin transglycosylase is added in an amount such that a maximum yield of said cyclodextrin can be obtained within one to seven days.

6. The method according to claim 3 wherein said cyclodextrin transglycosylase is added in an amount such that a maximum yield of said cyclodextrin be obtained within four to seven days.

7. The method according to claim 3 further characterized in that the amount of said cyclodextrin transglycosylase added falls within the range from about 100 to about 1,000 Tilden-Hudson units.

8. The method according to claim 3 wherein the intrinsic viscosity of said modified starch is below about 1.

9. A method for preparation of cyclodextrin from a granular modified starch which comprises:
   forming an aqueous slurry of a spray dried granular modified starch, said starch selected from the group consisting of acid-modified starch, oxidized starch, acid-modified and oxidized starch, white dextrin, gum dextrin, base modified starch, and mixtures thereof having a starch solids content of from about 5 percent to about 30 percent by weight;
   heating said slurry to gelatinize said granular modified starch;
   subjecting said slurry to the action of a cyclodextrin transglycosylase enzyme in the presence of a chemical which will complex cyclodextrin to obtain an insoluble complex product; and
   recovering said insoluble complex product.

10. The method according to claim 9 wherein the said granular modified starch is corn starch acid-modified to a fluidity falling within the range of from about 40 to about 90.

11. The method according to claim 9 wherein said granular modified starch is a waxy milo starch, acid-modified to about an 80 fluidity.

12. The method according to claim 9 wherein said granular modified starch is corn starch oxidized to a degree of carboxyl substitution falling within the range of from about 0.48 to about 0.77.

13. The method according to claim 9 wherein the said granular modified starch is corn starch acid-modified to about an 80 fluidity and oxidized to a degree of carboxyl substitution of about 0.41.

14. The method according to claim 9 wherein said compounds which will form a complex with cyclodextrin are selected from the group consisting of cyclohexane, hexane, toluene, n-decane, chloroform, p-xylene, p-cymene, tetrachloroethylene, bromobenzene, carbon disulfide, trichlorethylene, benzene, tetrachloroethane, carbon tetrachloride, and mixtures thereof.